United States Patent
Smich et al.

(10) Patent No.: US 10,718,650 B2
(45) Date of Patent: Jul. 21, 2020

(54) ROTARY GAS METER WITH FLANGE CONNECTION

(71) Applicant: Romet Limited, Mississauga (CA)

(72) Inventors: Andrew Smich, Mississauga (CA); Xinmin Wang, Mississauga (CA); Bong Joo Lee, North York (CA)

(73) Assignee: ROMET LIMITED, Mississauga (CA)

( * ) Notice: Subject to any disclaimer, the term of this patent is extended or adjusted under 35 U.S.C. 154(b) by 104 days.

(21) Appl. No.: 16/150,720

(22) Filed: Oct. 3, 2018

(65) Prior Publication Data

US 2019/0107422 A1 Apr. 11, 2019

Related U.S. Application Data

(60) Provisional application No. 62/570,718, filed on Oct. 11, 2017.

(51) Int. Cl.
*G01F 3/10* (2006.01)
*G01F 15/14* (2006.01)
*G01F 15/18* (2006.01)

(52) U.S. Cl.
CPC .............. *G01F 3/10* (2013.01); *G01F 15/14* (2013.01); *G01F 15/18* (2013.01)

(58) Field of Classification Search
CPC ............. G01F 3/10; G01F 15/14; G01F 15/18
USPC ........................................................ 73/253
See application file for complete search history.

(56) References Cited

U.S. PATENT DOCUMENTS

| | | | | |
|---|---|---|---|---|
| 2,274,206 A * | 2/1942 | Marsh | ...................... | G01F 3/06 73/253 |
| 3,109,382 A * | 11/1963 | Farrell | ...................... | G01F 3/06 418/141 |
| 3,245,258 A * | 4/1966 | Rystrom | ................... | G01F 3/10 73/261 |
| 4,553,433 A * | 11/1985 | Hicks | ..................... | G01F 15/14 73/273 |
| 5,513,529 A * | 5/1996 | Kolb, III | .................. | G01F 3/06 73/253 |
| 5,970,791 A * | 10/1999 | Barczynski | ............. | F01C 1/123 417/540 |
| 8,161,812 B1 * | 4/2012 | Fischer | ..................... | G01F 3/10 73/261 |
| 8,166,830 B2 * | 5/2012 | Vo | ............................. | G01F 3/10 73/861.77 |
| 2006/0059987 A1 * | 3/2006 | Melville | ................. | G01F 1/363 73/202.5 |
| 2009/0311105 A1 * | 12/2009 | Grzeslo | ................ | F01C 19/005 416/240 |

* cited by examiner

*Primary Examiner* — Nathaniel T Woodward (57) ABSTRACT

A gas meter with a rated maximum flow capacity of greater than 3,000 CFH (Cubic Feet per Hour)—for example, between 3,500 CFH and 7,000 CFH—is provided with 2-inch flange connectors. One or more undercuts are provided in the meter body to promote satisfactory performance in terms of, for example, differential pressures at the meter inlet and outlet.

10 Claims, 14 Drawing Sheets

ROTARY GAS METER WITH FLANGE CONNECTION

FIELD

This disclosure relates generally to gas meter equipment, and more specifically to rotary gas meters with flange connections.

INTRODUCTION

Gas meters may be used to measure volumes of gas transported and/or used for heating or cooling purposes. For large-scale and/or industrial uses, most gases are typically sold on a price-per-volume basis (e.g. $5 per 1,000 cubic feet). Accordingly, it is generally considered desirable to measure gases being transported and/or used with a relatively high degree of accuracy.

A common method of providing accurate measurement of a transported/consumed gas is the use of one or more positive displacement rotary gas meters. When gas flows through such a rotary gas meter, fixed volumes of gas are displaced by, for example, two figure-eight impellers that rotate in opposite directions within a cylinder of known volume. The impellers of the gas meter rotate because of a lower differential pressure at the outlet of the meter than is present at the inlet. As they rotate, a fixed volume of gas or other fluid is entrapped and then moved toward the outlet. Therefore, with each full rotation of the impellers, a known volume of gas or other fluid is displaced through the outlet.

SUMMARY

The following introduction is provided to introduce the reader to the more detailed discussion to follow. The introduction is not intended to limit or define any claimed or as yet unclaimed invention. One or more inventions may reside in any combination or sub-combination of the elements or process steps disclosed in any part of this document including its claims and figures.

Gas meters, such as rotary gas meters, typically have a rated flow capacity, which can be expressed in CFH (Cubic Feet per Hour). Rated flow capacity is often a (if not the) significant consideration when selecting a gas meter (or gas meters) for use in a particular application. For example, a designer of a gas piping system may select a gas meter rated for 80% of the expected maximum gas flow through the system.

Also, gas meters, such as rotary gas meters, are often provided with connection interfaces that conform to one or more industry standards. For example, the B16.5 Standard (as published by the American Society of Mechanical Engineers (ASME) and/or the American National Standards Institute (ANSI)) covers pressure-temperature ratings, materials, dimensions, tolerances, marking, testing, and methods of designating openings for pipe flanges and flanged fittings.

The size of the inlet and outlet ports of a gas meter is typically proportional to the rated flow capacity of the gas meter. That is, gas meters with larger rated flow capacities typically have larger inlet and outlet ports. For example, for rotary gas meters with flange connections at their inlet and outlet ports, gas meters with flow ratings of less than 3,000 CFH (and in some cases those rated for 3,000 CFH) are typically provided with 2-inch flange connections, while gas meters with flow ratings of between 3,000 to 7,000 CFH are typically provided with 3-inch flange connections. Larger meters (e.g. greater than 7,000 CFH) typically have larger flange connections (e.g. 4-inch or 6-inch or larger).

In some markets, demand for gas consumption (e.g. in industrial and/or commercial sectors) is increasing, in some cases drastically. Consequently, there is expected to be a demand to increase gas throughput in existing gas flow systems. However, once a gas flow system has been installed in e.g. an industrial, commercial, or residential building, increasing the rated flow capacity of the system may present a number of challenges.

For example, a gas flow system initially designed for a flow capacity of 3,000 CFH (or less) may have used 2-inch ANSI pipes and flanges. In the conventional standard, a gas flow system for a higher flow capacity (e.g. 3,500 or 5,000 or 7,000 CFH) would use 3-inch ANSI pipes and flanges. Accordingly, converting an existing 3,000 CFH rated system that has 2-inch pipe and flange connectors to increase the system capacity to e.g. 5,000 CFH would typically require redesigning and reconstructing the piping system (e.g. cutting out existing 2-inch flange connector pipe fittings and re-welding new 3-inch pipe fittings), which may increase the cost of increasing the system flow capacity. Also, reconstructing a piping system also requires shutting off the flow of gas (at least temporarily) during the reconstruction, which is often considered undesirable.

In accordance with one aspect of this disclosure, a rotary gas meter having a rated capacity of greater than 3,000 CFH (e.g. 3,500 or 5,000 or 7,000 CFH) is provided with standard 2-inch flange connectors, preferably conforming to the ANSI/ASME 16.5 Standard (e.g. 2-inch Class 125/150 ANSI B16.5 flange connections).

Providing a gas meter with standard 2-inch flange connectors and a rated maximum flow capacity of greater than 3,000 CFH may have one or more advantages. For example, such a gas meter may be used to replace an existing gas meter that has standard 2-inch flange connectors and a maximum flow rating of 3,000 CFH (or less) without requiring redesign or reconstruction of the existing 2-inch piping system. Put another way, since the new gas meter (with a larger flow rating) has 2-inch ANSI flange configurations at the meter's inlet and outlet, the new, larger meter can be coupled to an existing 2-inch piping system without expanding and/or replacing the pipes and/or flange connections in the existing (2-inch) system, which would typically otherwise be required to install a larger gas meter that has conventional flange connection sizing (i.e. 3-inch ANSI). This may save time and/or decrease costs when increasing the rated capacity of an existing gas flow system.

In accordance with a broad aspect, there is provided a rotary gas meter comprising: a meter body having a gas inlet port and an associated inlet flange connection, a gas outlet port and an associated outlet flange connection, and a main chamber in flow communication with the gas inlet port and the gas outlet port; wherein at least one undercut is provided in the meter body between the gas inlet port and the main chamber; wherein at least one undercut is provided in the meter body between the main chamber and the gas outlet port; wherein the inlet flange connection is a standard 2-inch connection; wherein the outlet flange connection is a standard 2-inch connection; and wherein the rotary gas meter has a rated maximum flow capacity of greater than 3,000 CFH (Cubic Feet per Hour).

In some embodiments, the rated maximum flow capacity is between 3,500 CFH and 7,000 CFH.

In some embodiments, the rated maximum flow capacity is about 5,000 CFH.

In some embodiments, the inlet flange connection conforms to the ANSI/ASME 16.5 Standard.

In some embodiments, the outlet flange connection conforms to the ANSI/ASME 16.5 Standard.

In some embodiments, the at least one undercut provided in the meter body between the gas inlet port and the main chamber is at an angle of between about 30 degrees and about 60 degrees to the gas inlet port.

In some embodiments, the at least one undercut provided in the meter body between the gas inlet port and the main chamber is at an angle of about 45 degrees to the gas inlet port.

In some embodiments, the at least one undercut provided in the meter body between the main chamber and the gas outlet port is at an angle of between about 30 degrees and about 60 degrees to the gas outlet port.

In some embodiments, the at least one undercut provided in the meter body between the main chamber and the gas outlet port is at an angle of about 45 degrees to the gas outlet port.

In some embodiments, the rotary gas meter further comprises a positive displacement metering apparatus comprising lobed impellers positioned in the main chamber.

It will be appreciated by a person skilled in the art that a method or apparatus disclosed herein may embody any one or more of the features contained herein and that the features may be used in any particular combination or sub-combination.

These and other aspects and features of various embodiments will be described in greater detail below.

BRIEF DESCRIPTION OF THE DRAWINGS

For a better understanding of the described embodiments and to show more clearly how they may be carried into effect, reference will now be made, by way of example, to the accompanying drawings in which.

The drawings included herewith are for illustrating various examples of articles, methods, and apparatuses of the teaching of the present specification and are not intended to limit the scope of what is taught in any way.

DESCRIPTION OF EXAMPLE EMBODIMENTS

Various apparatuses, methods and compositions are described below to provide an example of an embodiment of each claimed invention. No embodiment described below limits any claimed invention and any claimed invention may cover apparatuses and methods that differ from those described below. The claimed inventions are not limited to apparatuses, methods and compositions having all of the features of any one apparatus, method or composition described below or to features common to multiple or all of the apparatuses, methods or compositions described below. It is possible that an apparatus, method or composition described below is not an embodiment of any claimed invention. Any invention disclosed in an apparatus, method or composition described below that is not claimed in this document may be the subject matter of another protective instrument, for example, a continuing patent application, and the applicant(s), inventor(s) and/or owner(s) do not intend to abandon, disclaim, or dedicate to the public any such invention by its disclosure in this document.

Furthermore, it will be appreciated that for simplicity and clarity of illustration, where considered appropriate, reference numerals may be repeated among the figures to indicate corresponding or analogous elements. In addition, numerous specific details are set forth in order to provide a thorough understanding of the example embodiments described herein. However, it will be understood by those of ordinary skill in the art that the example embodiments described herein may be practiced without these specific details. In other instances, well-known methods, procedures, and components have not been described in detail so as not to obscure the example embodiments described herein. Also, the description is not to be considered as limiting the scope of the example embodiments described herein.

While the apparatus and methods disclosed herein are described specifically in relation to conventional positive displacement rotary gas meters, it will be appreciated that the apparatus and methods may alternatively be used with other types of rotary gas meters.

As discussed above, the size of the inlet and outlet ports of a gas meter, such as a rotary gas meter, is typically proportional to the rated flow capacity of the gas meter. Conventionally, rotary gas meters with flow ratings of less than 3,000 CFH (and in some cases those rated for 3,000 CFH) are typically provided with standard 2-inch flange connections (e.g. conforming to the ANSI/ASME 16.5 Standard, such as 2-inch Class 125/150 ANSI B16.5 flange connections). Rotary gas meters with flow ratings of between 3,000 to 7,000 CFH are typically provided with 3-inch flange connections (e.g. 3-inch ANSI connectors).

FIGS. 1 to 4 illustrate an example of a positive displacement rotary gas meter 1000 having a rated flow capacity (or simply 'rating') of 2,000 CFH. The gas meter 1000 includes a meter body 1100, which has a gas flow inlet 1110 provided at an upper end of the meter body 1100, and a gas flow outlet 1120 provided at a lower end of the meter body 1100.

In the illustrated example, standard 2-inch flange connections 1130 are provided at the gas flow inlet 1110 and outlet 1120 of meter body 1100. For example, 2-inch flange connections 1130 may conform to the ANSI/ASME 16.5 Standard (e.g. 2-inch Class 125/150 ANSI B16.5 flange connections).

In use, a gas flow to be measured (e.g. natural gas) enters the meter body via gas flow inlet 1110, passes through an internal inlet antechamber or throat 1115 and into a main chamber 1150. After passing through the main chamber 1150, the gas flow passes through an internal outlet antechamber or throat 1125 and exits the meter body via gas flow outlet 1120.

Any suitable metering equipment may be provided in main chamber 1150 to measure the gas flow. For example, as the gas flow passes through the main chamber 1150, one or more impellers (not shown) positioned in the main chamber 1150 may rotate in proportion to the gas flow. For example, in a positive displacement rotary gas meter, with each full impeller rotation a known volume of gas travels between gas flow inlet 1110 and gas flow outlet 1120.

An inlet instrumentation port 1117 in communication with inlet antechamber or throat 1115 provides access for one or more sensors (e.g. a pressure sensor or a temperature sensor) to measure conditions associated with the gas flow entering the meter body 1100. Similarly, an outlet instrumentation port 1127 in communication with outlet antechamber or throat 1125 provides access for one or more sensors to measure conditions associated with the gas flow exiting the meter body 1110.

FIGS. 5 to 8 illustrate an example of a positive displacement rotary gas meter 2000 having a rated flow capacity (or simply 'rating') of 5,000 CFH. Elements having similar structure and/or performing similar function as those in the example gas meter illustrated in FIGS. 1 to 4 are numbered similarly, with the reference numerals incremented by 1000.

In the illustrated example, standard 3-inch flange connections 2130 are provided at the gas flow inlet 2110 and outlet 2120 of meter body 2100. For example, 3-inch flange connections 2130 may conform to the ANSI/ASME 16.5 Standard (e.g. 3-inch Class 125/150 ANSI B16.5 flange connections).

FIGS. 9 to 13 illustrate an example of a positive displacement rotary gas meter 3000 having a rated flow capacity (or simply 'rating') of 5,000 CFH. Elements having similar structure and/or performing similar function as those in the example gas meter illustrated in FIGS. 1 to 4 are numbered similarly, with the reference numerals incremented by 2000.

In the illustrated example, standard 2-inch flange connections 3130 are provided at the gas flow inlet 3110 and outlet 3120 of meter body 3100. For example, 2-inch flange connections 3130 may conform to the ANSI/ASME 16.5 Standard (e.g. 2-inch Class 125/150 ANSI B16.5 flange connections).

As discussed above, providing a gas meter with standard 2-inch flange connectors and a rated maximum flow capacity of greater than 3,000 CFH (e.g. between 3,500 CFH and 7,000 CFH), such as the example illustrated in FIGS. 9 to 13, may have one or more advantages when compared to gas meters with conventional flange connection sizes (i.e. 3-inch flange connections for gas meters with flow ratings of between 3,000 to 7,000 CFH). However, modifying the design of a gas meter having a maximum rated capacity of between 3,000 CFH to 7,000 CFH to have a standard 2-inch flange connection (e.g. a 2-inch ANSI flange connection) while maintain an acceptable level of metering accuracy presented one or more challenges.

For example, one significant challenge was the increase in pressure at the gas flow inlet 3110 and gas flow outlet 3120 that resulted from decreasing their diameters from the diameter specified for a standard 3-inch ANSI flange connection (i.e. 3.00 inches) to the diameter specified for a standard 2-inch ANSI flange connection (i.e. 1.56 inches).

As shown in FIGS. 9 to 11 and 13, a first pair of undercuts 3160 are provided in the meter body 3100 at an upper portion of the antechamber or throat 3115 of the gas flow inlet 3110. Undercuts 3160 provide an increased flow area between gas flow inlet 3110 and main chamber 3150, which is thought to provide expansion conditions similar to those provided by a diffuser. Accordingly, providing undercuts 3160 in meter body 3100 may provide improved expansion conditions of an inlet gas flow, which may assist in reducing differential pressure between the gas flow inlet 3110 and the gas flow outlet 3120.

Also, a second pair of undercuts 3160 are provided in the meter body 3100 at a lower portion of the antechamber or throat 3125 of the gas flow outlet 3120. These undercuts provide an increased flow area between main chamber 3150 and gas flow outlet 3120, which is thought to provide compression conditions similar to those provided by a nozzle. Accordingly, providing undercuts 3160 in meter body 3100 may provide improved compression conditions of an outlet gas flow, which may assist in improving the performance of the meter in terms of differential pressure between the gas flow inlet 3110 and the gas flow outlet 3120.

Figure 14:
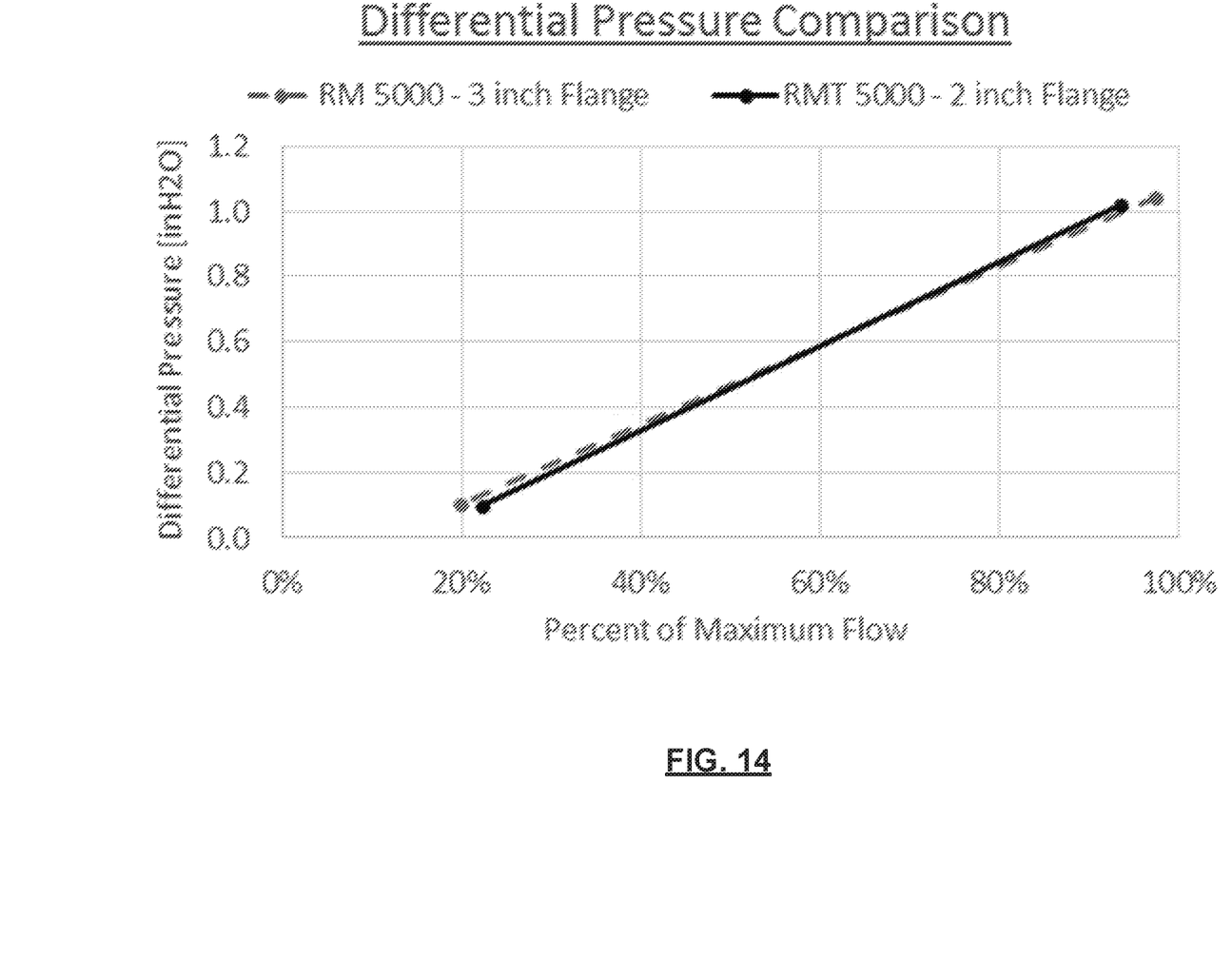
FIG. 14 is a plot of test results of differential pressures for a 5,000 CFH gas meter having a 3-inch flange connection, and for a 5,000 CFH gas meter having a 2-inch flange connection.

For example, test results for a 5,000 CFH rated gas meter with a 2-inch flange connection (e.g. as illustrated in FIGS. 9 to 13) are compared with results for a 5,000 CFH rated gas meter with a 3-inch flange connection (e.g. as illustrated in FIGS. 5 to 8) in table 1, and the results are plotted in FIG. 14.

TABLE 1

|  | Percentage of Max Flow [%] | Flow [CFH] | Differential Pressure [inH$_2$0] |
| --- | --- | --- | --- |
| 5,000 CFH, 3-inch flange connection | 97.41% | 4870.64 | 1.04 |
|  | 19.80% | 990.22 | 0.10 |
| 5,000 CFH, 2-inch flange connection | 93.52% | 4675.80 | 1.02 |
|  | 22.32% | 1115.95 | 0.10 |

These results indicate that a 5,000 CFH rated gas meter with a 2-inch flange connection and undercuts 3160 as illustrated in FIGS. 9 to 13 may be expected to provide comparable metering performance when compared to a 5,000 CFH rated gas meter with a 3-inch flange connection (e.g. as illustrated in FIGS. 5 to 8).

In the example illustrated in FIGS. 9 to 13, two undercuts 3160 are provided in the meter body 3100 between gas flow inlet 3110 and main chamber 3150, and two undercuts 3160 are provided in the meter body 3100 between main chamber 3150 and gas flow outlet 3120. While this is considered a preferable configuration, e.g. in terms of symmetry and/or machinability, it will be appreciated that more or fewer undercuts could be provided in alternative embodiments.

Figure 1:
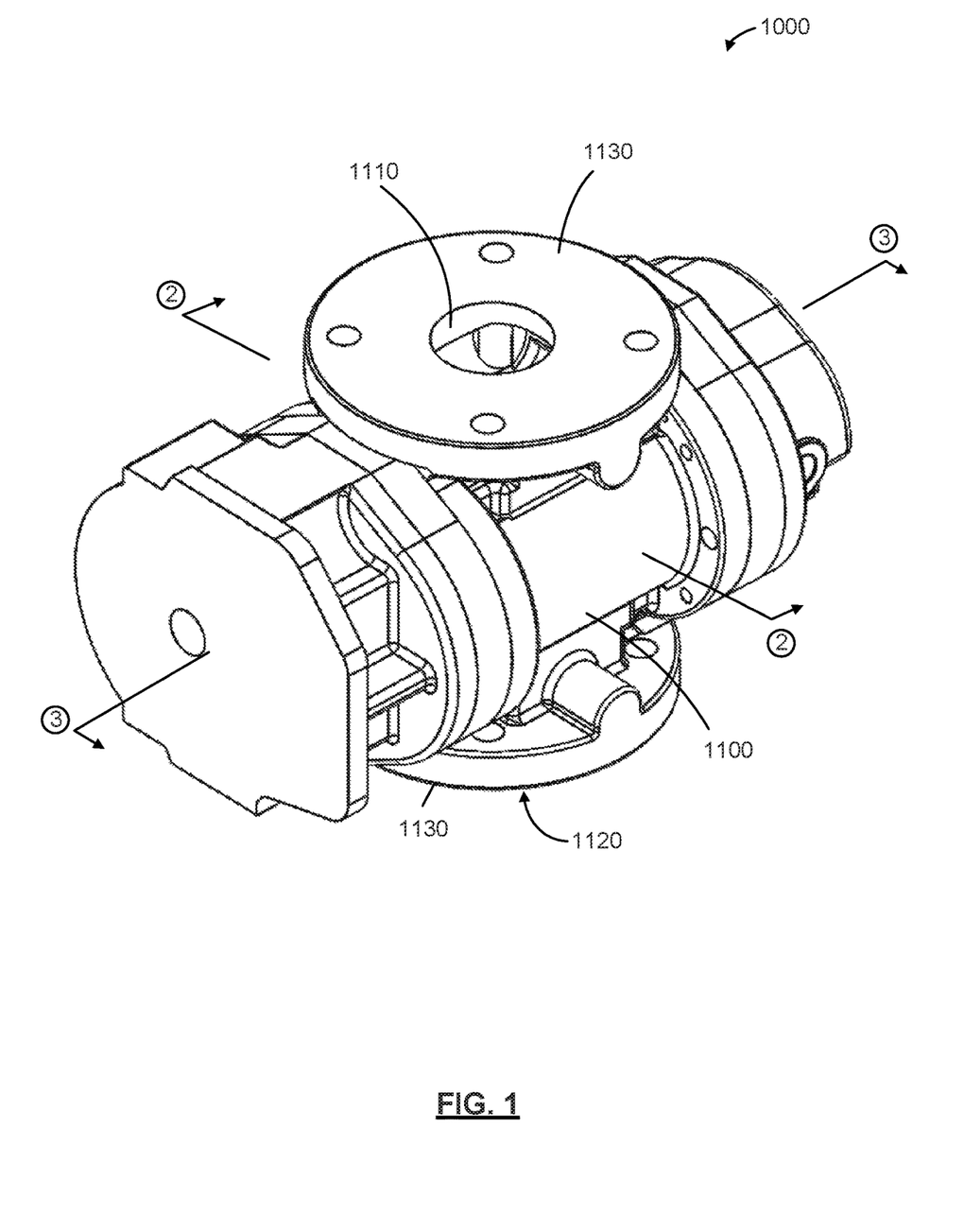
FIG. 1 is a perspective view of a gas meter having a rated flow capacity of 2,000 CFH (Cubic Feet per Hour) and a 2-inch flange connection.
Figure 2:
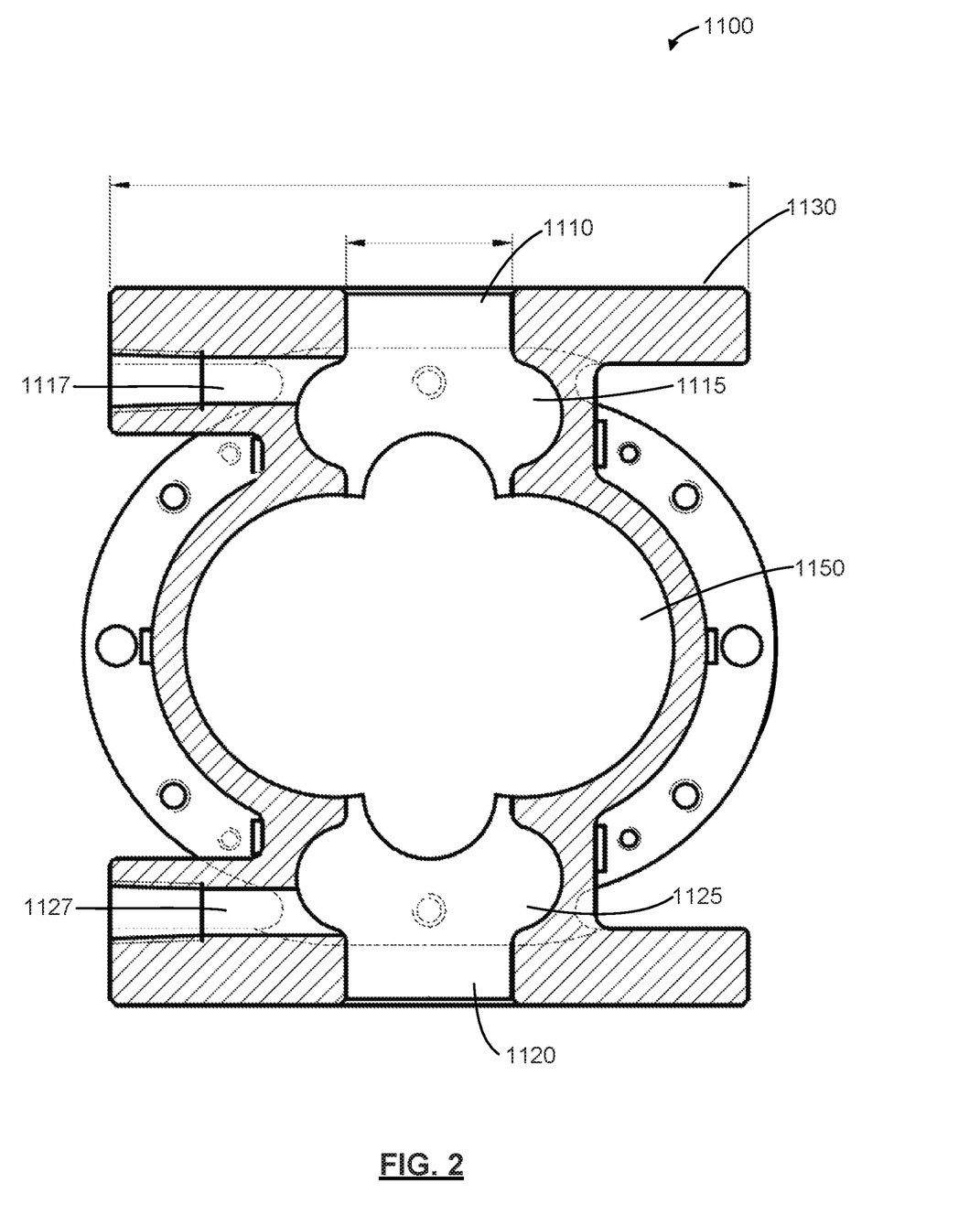
FIG. 2 is a cross-sectional view of the body of the gas meter of FIG. 1, taken along line 2-2.
Figure 3:
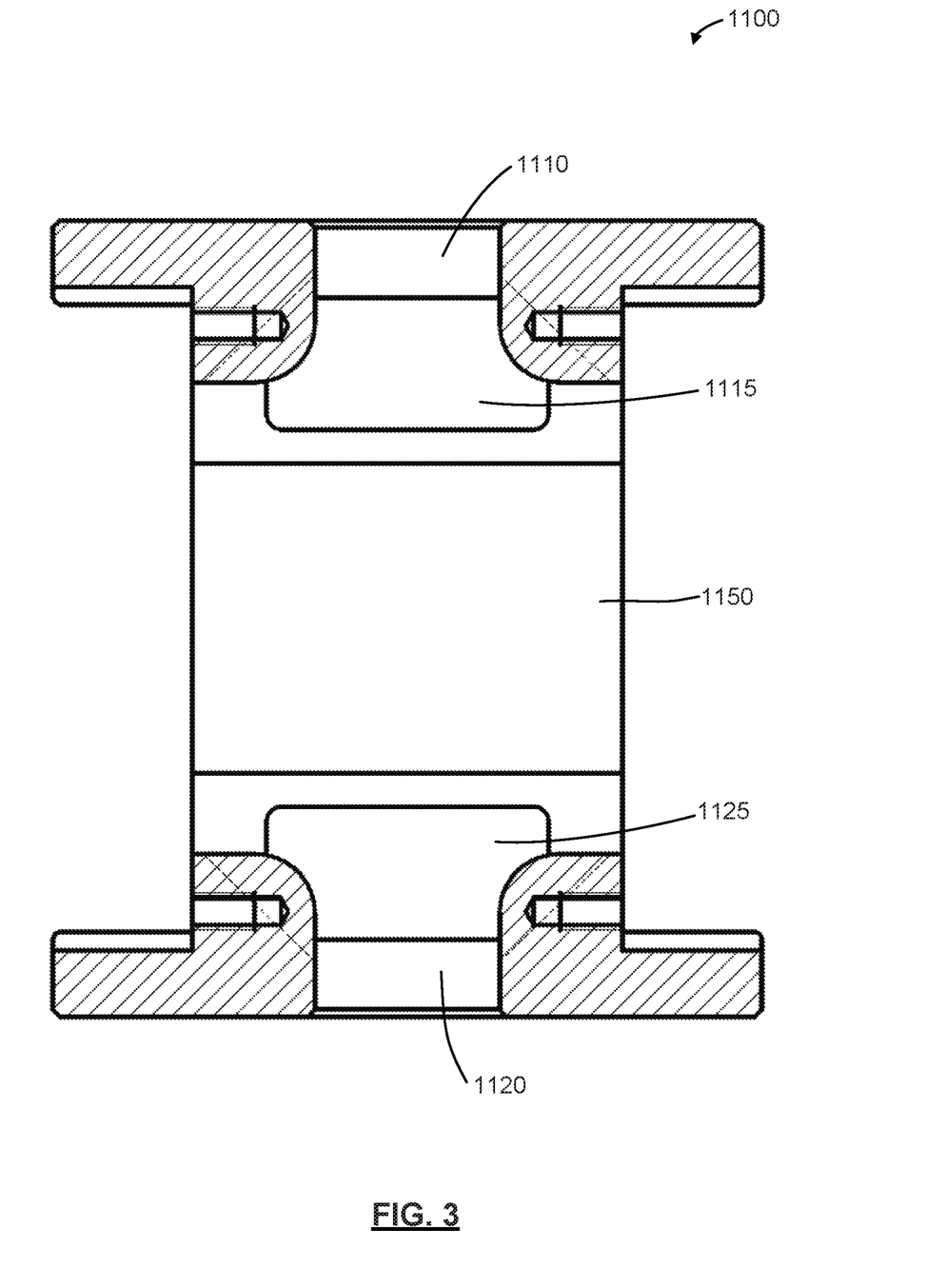
FIG. 3 is a cross-sectional view of the body of the gas meter of FIG. 1, taken along line 3-3.
Figure 4:
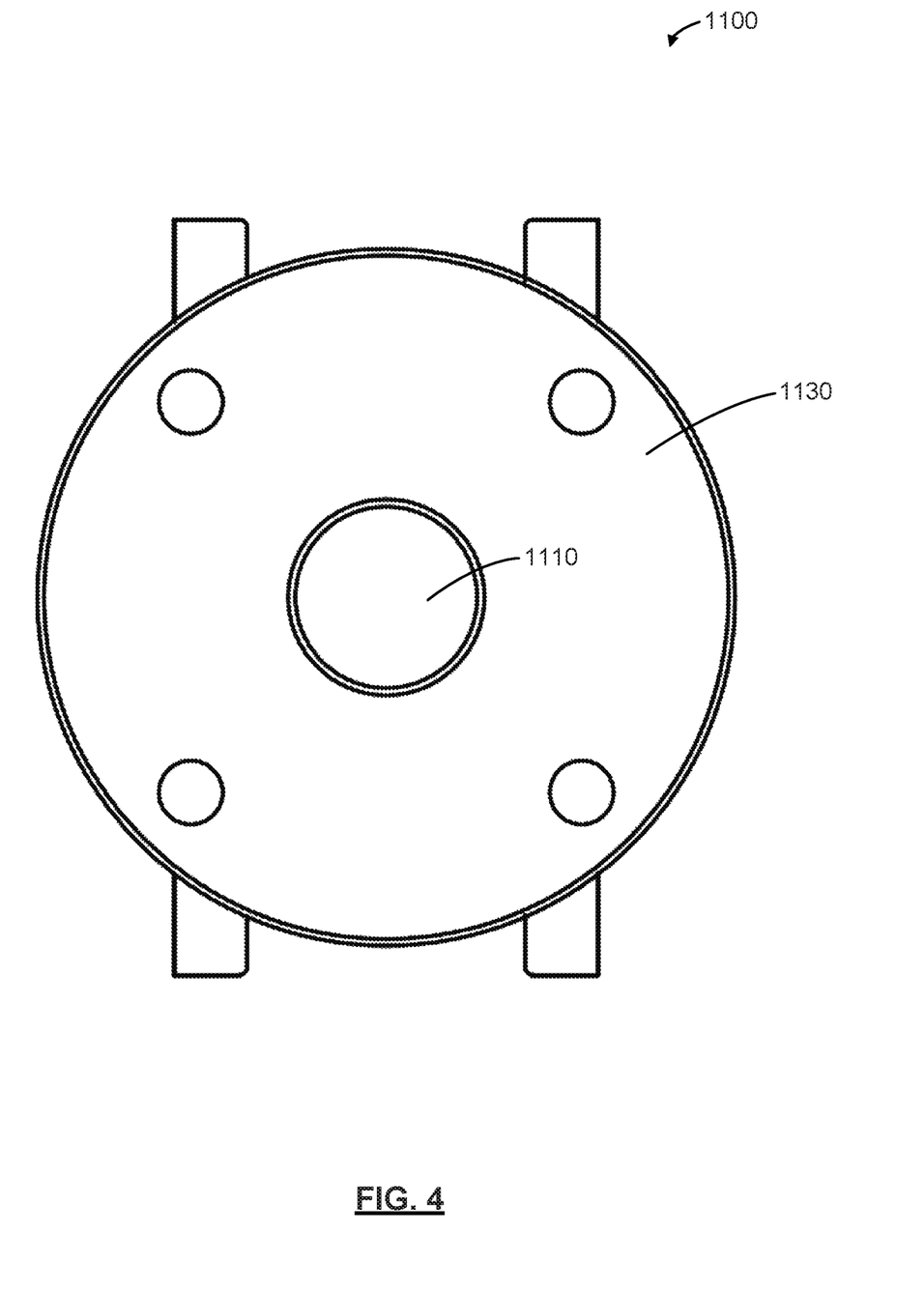
FIG. 4 is a top view of the body of the gas meter of FIG. 1.
Figure 5:
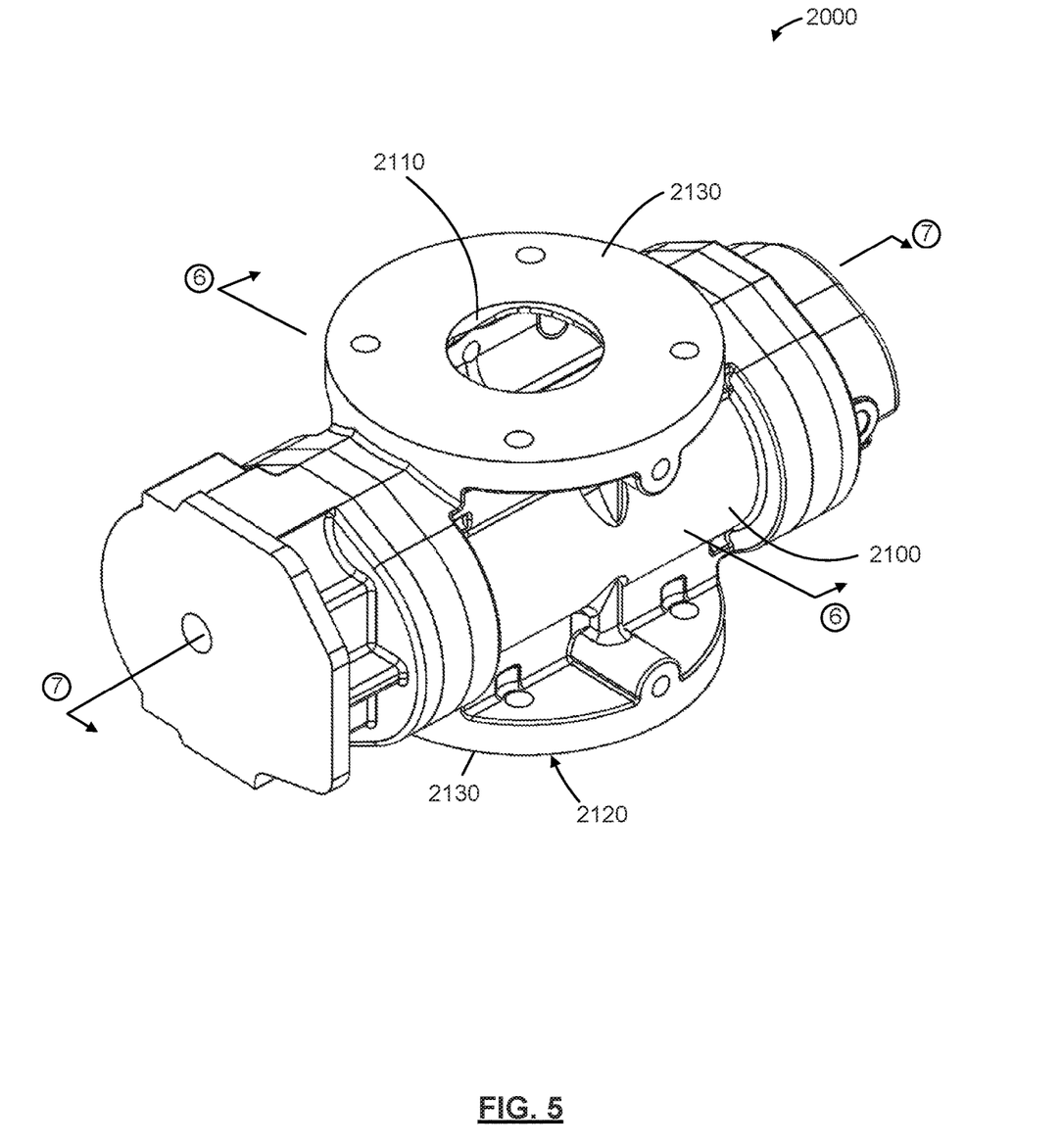
FIG. 5 is a perspective view of a gas meter having a rated flow capacity of 5,000 CFH and a 3-inch flange connection.
Figure 6:
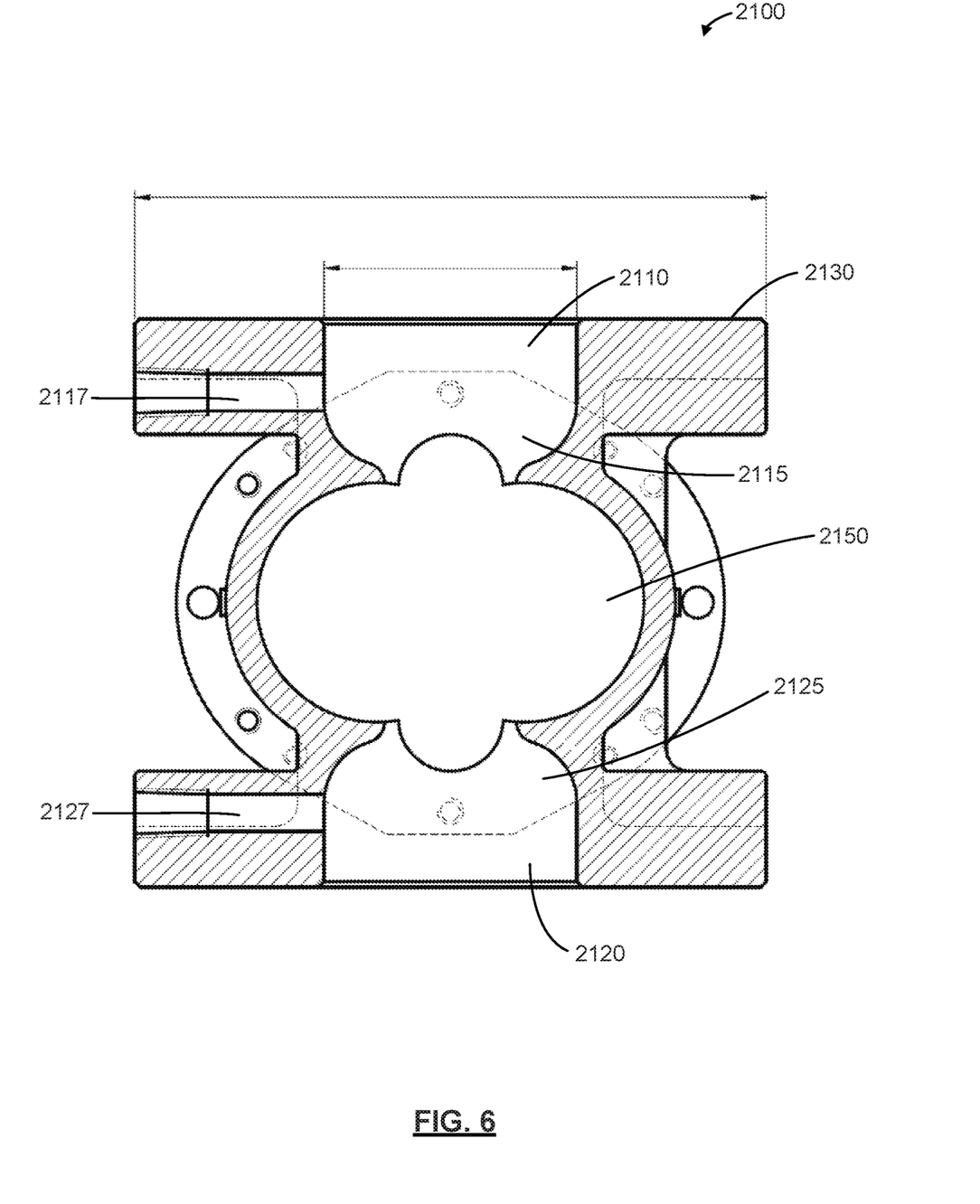
FIG. 6 is a cross-sectional view of the body of the gas meter of FIG. 5, taken along line 6-6.
Figure 7:
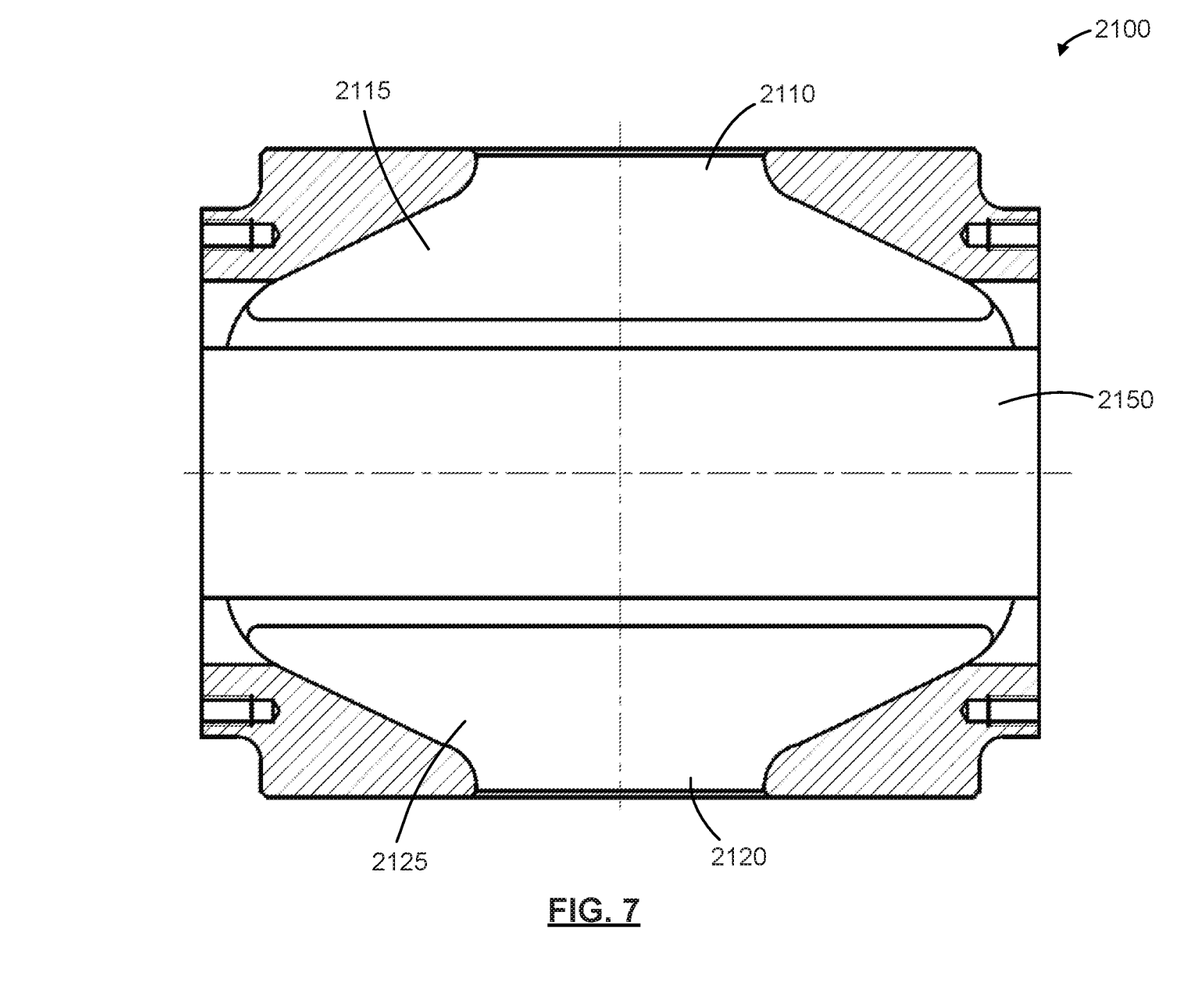
FIG. 7 is a cross-sectional view of the body of the gas meter of FIG. 5, taken along line 7-7.
Figure 8:
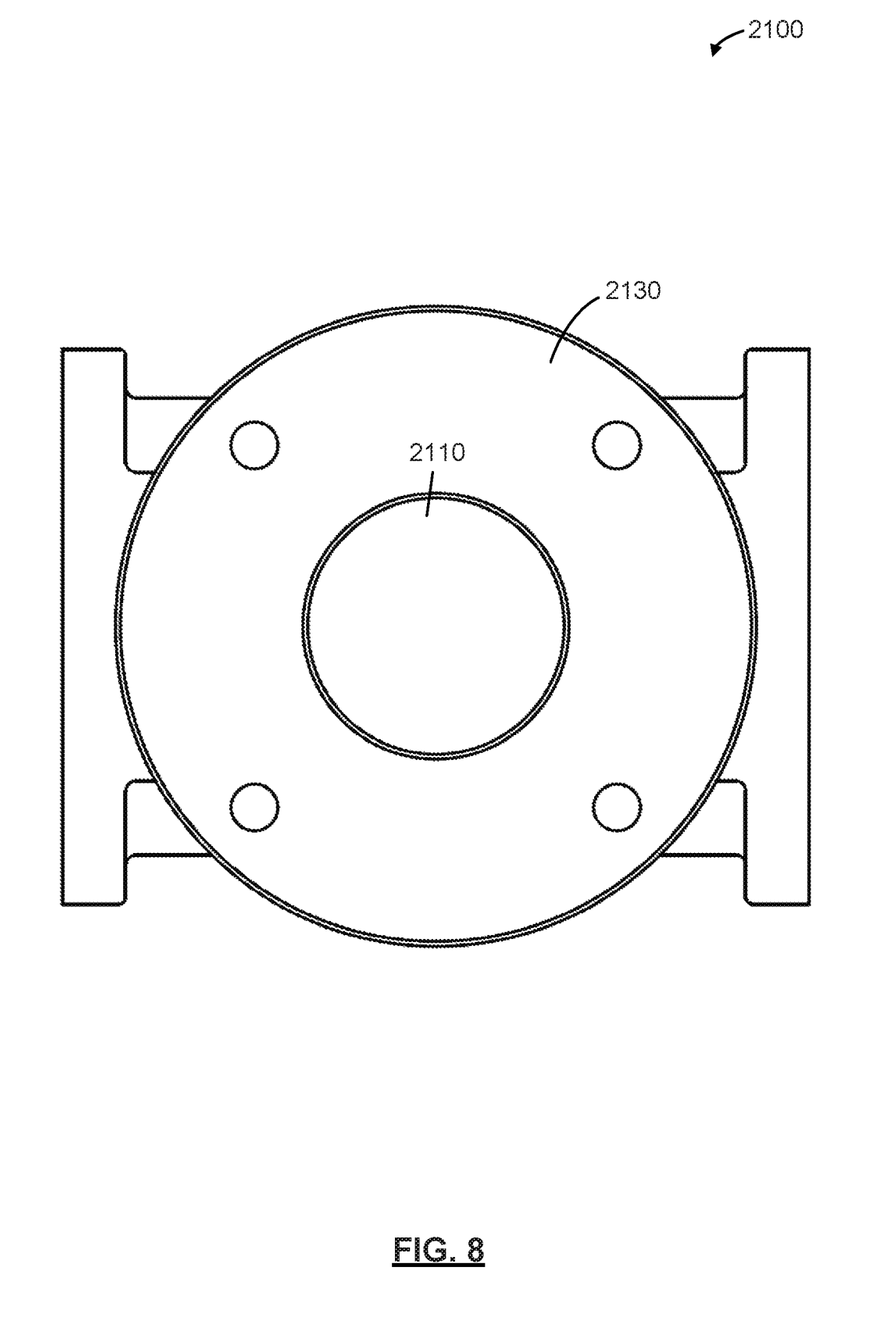
FIG. 8 is a top view of the body of the gas meter of FIG. 5.
Figure 9:
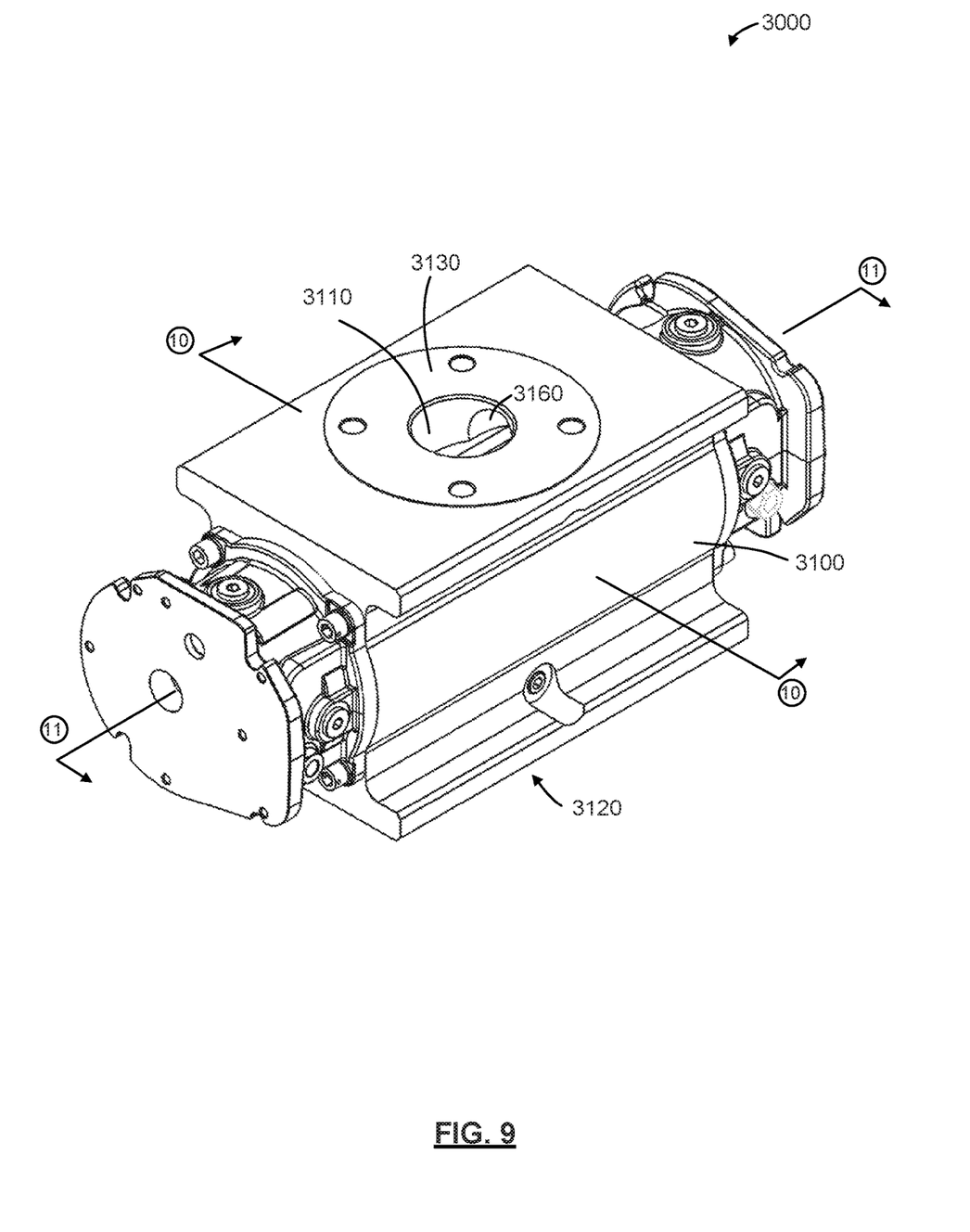
FIG. 9 is a perspective view of a gas meter having a rated flow capacity of 5,000 CFH and a 2-inch flange connection.
Figure 10:
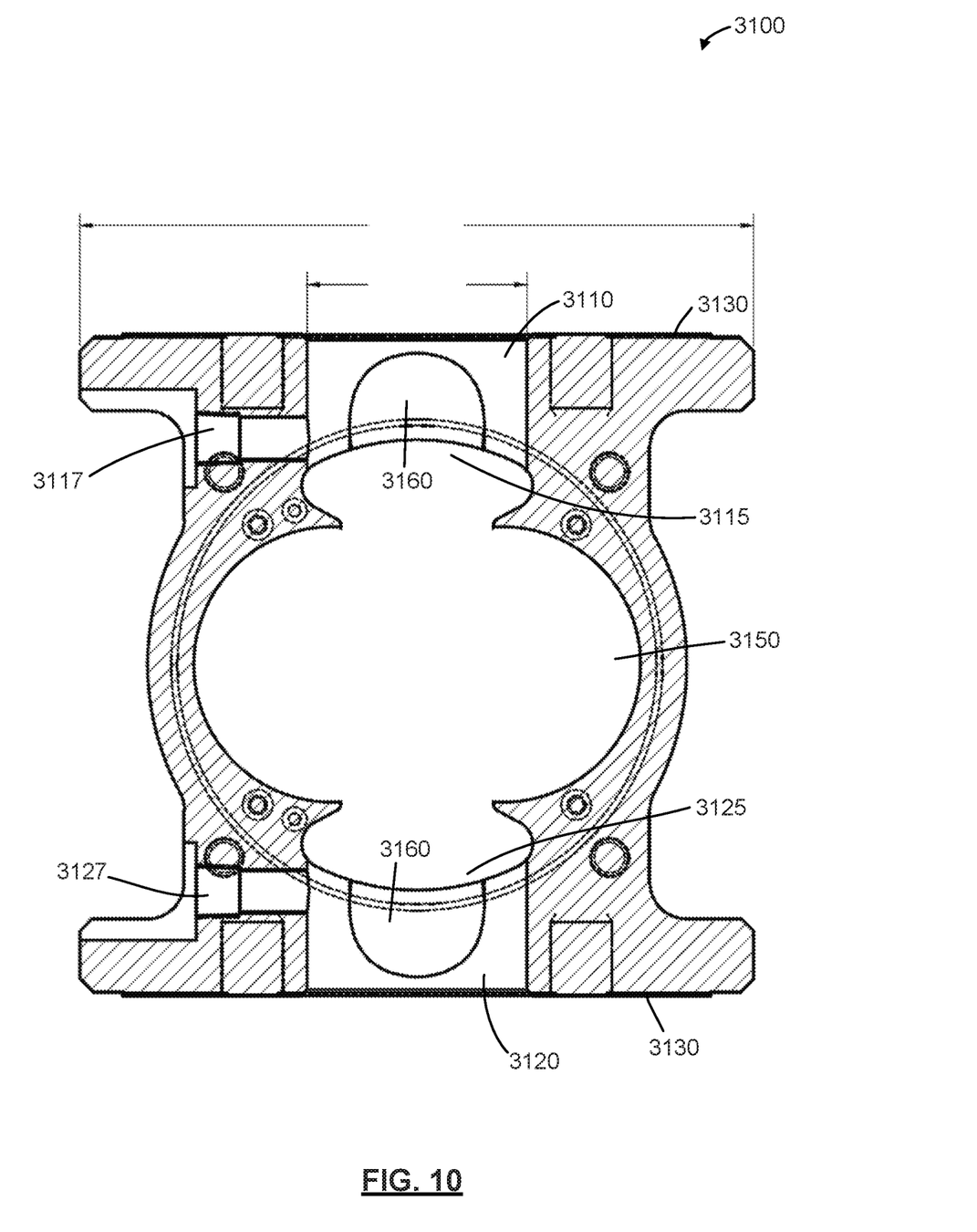
FIG. 10 is a cross-sectional view of the body of the gas meter of FIG. 9, taken along line 10-10.
Figure 11:
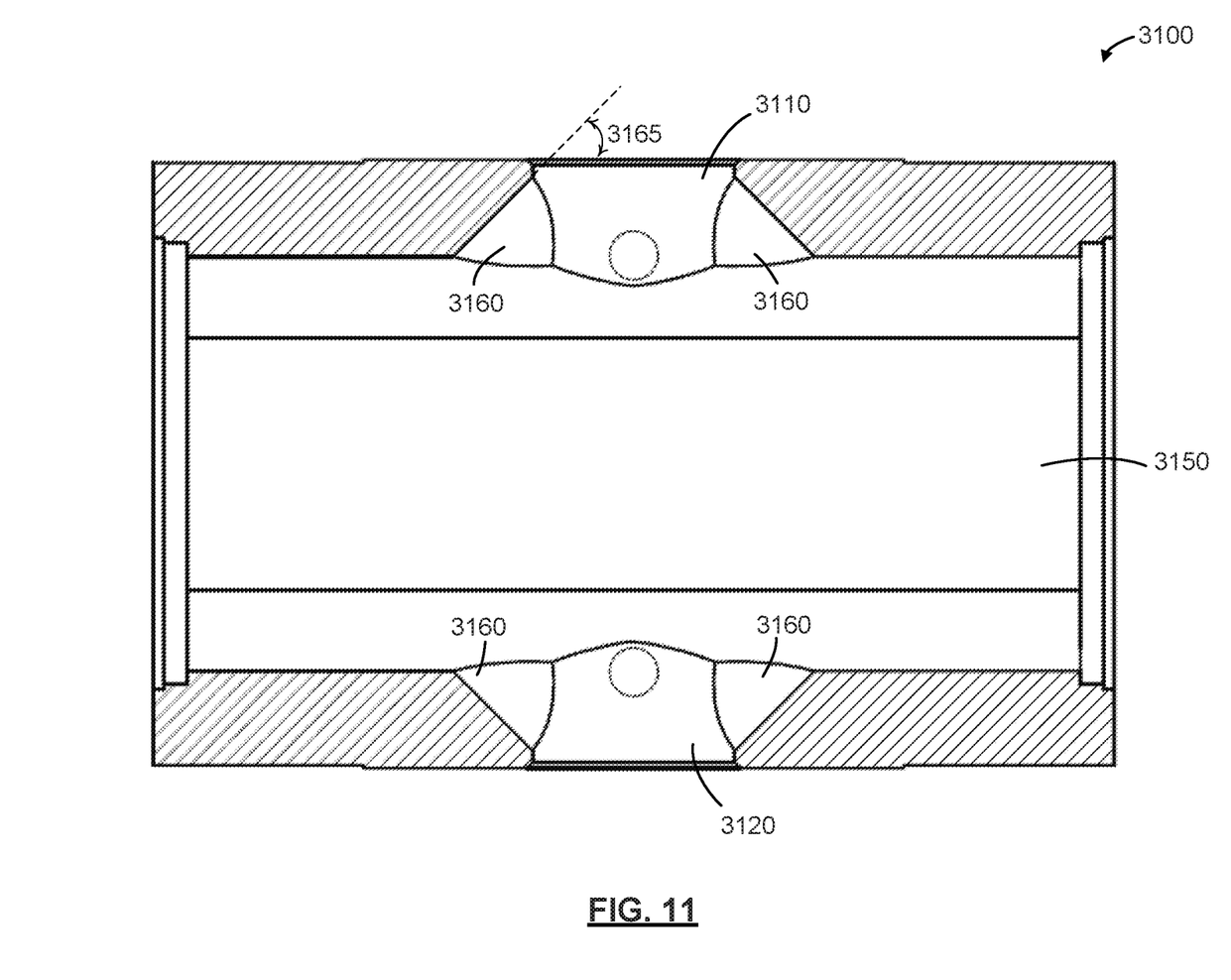
FIG. 11 is a cross-sectional view of the body of the gas meter of FIG. 9, taken along line 11-11.
Figure 12:
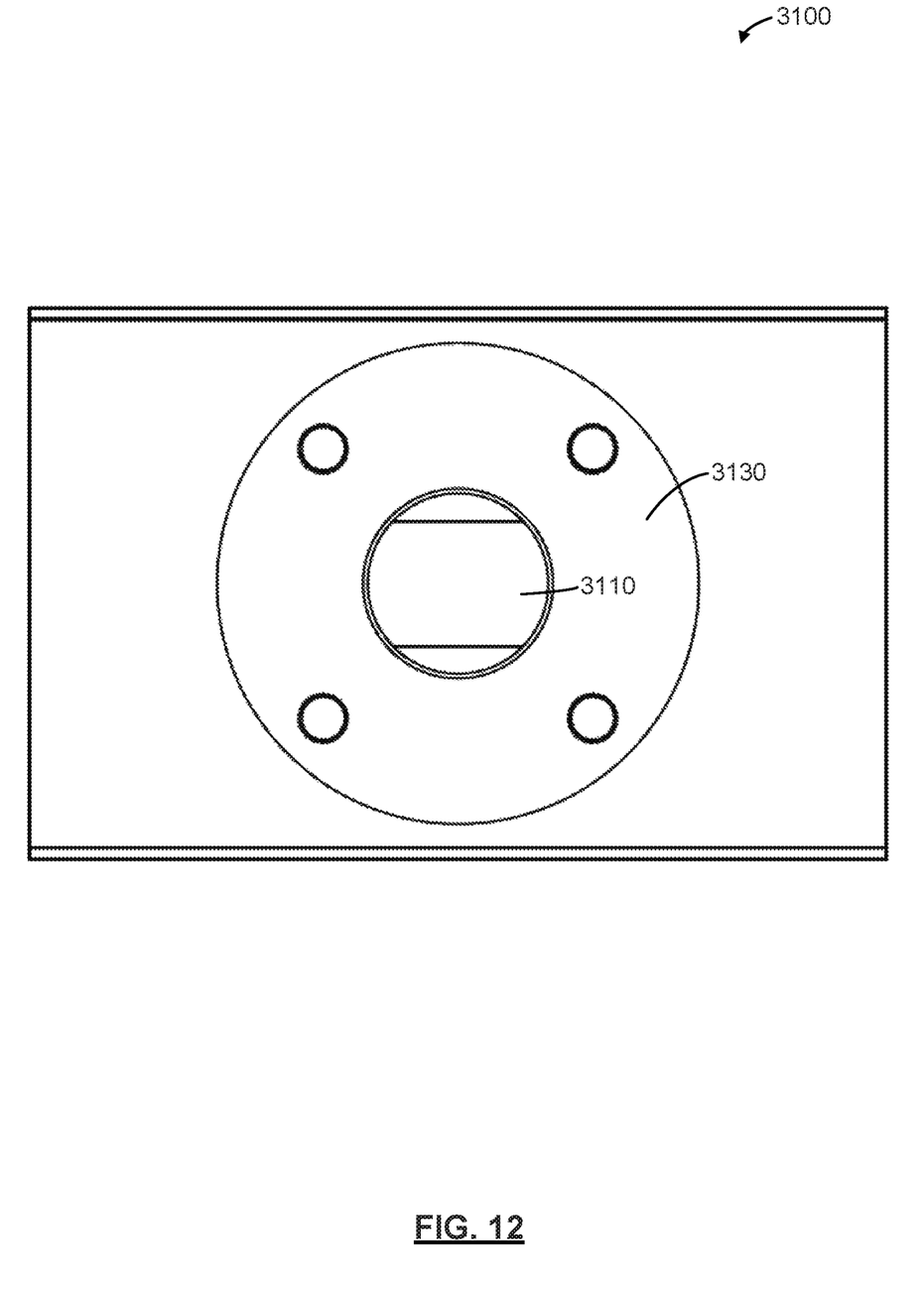
FIG. 12 is a top view of the body of the gas meter of FIG. 9.
Figure 13:
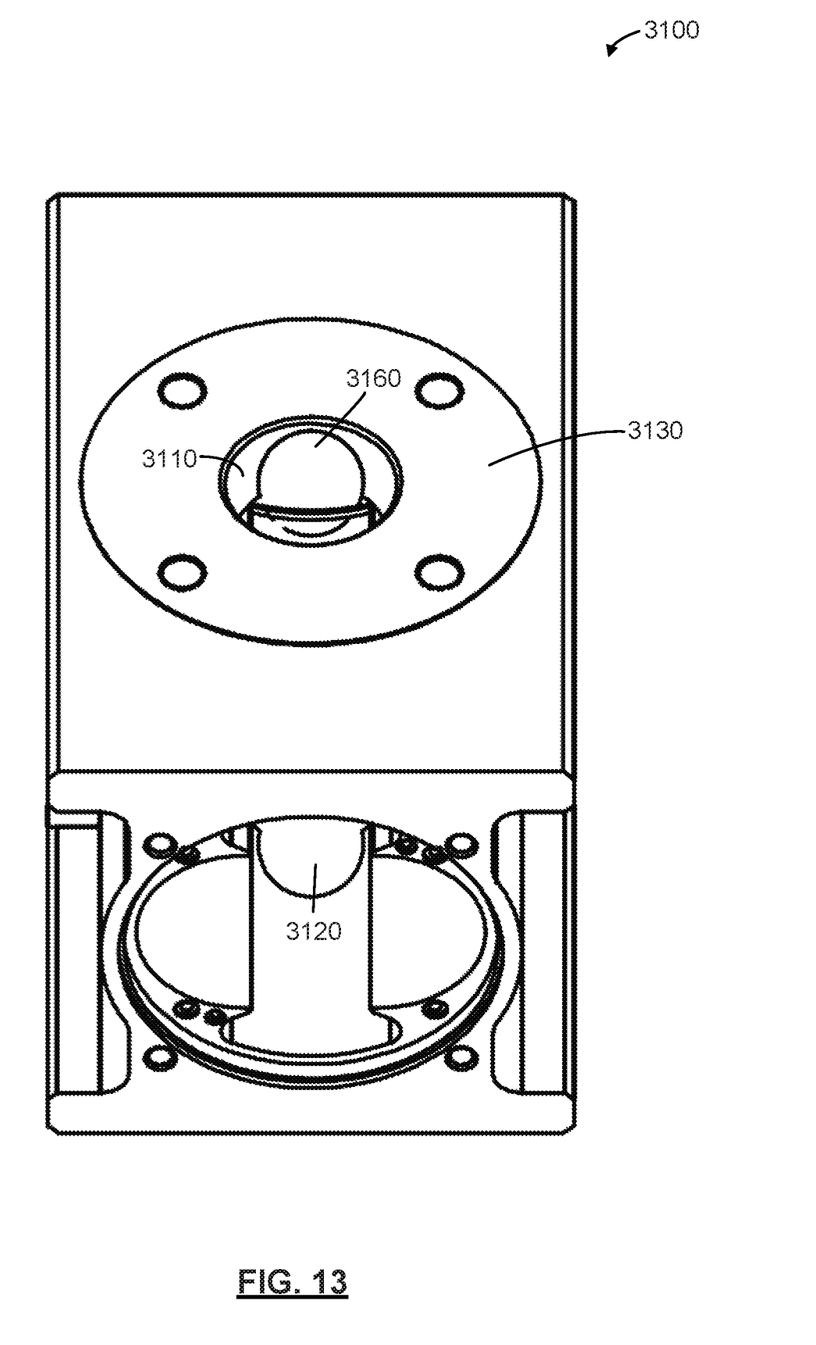
FIG. 13 is top perspective view of the body of the gas meter of FIG. 9.

Also, in the illustrated example each undercut 3160 is oriented at an angle 3165 of about 45° (see e.g. FIG. 11). It will be appreciated that angle 3165 may be greater or smaller (e.g. from about 30° to about 60°), depending on e.g. the dimensions and/or CFH rating of meter body 3110.

Also, in the illustrated example each undercut 3160 has a generally parabolic profile. It will be appreciated that in alternative embodiments undercuts 3160 may have circular or other suitable profiles.

Providing a gas meter with standard 2-inch flange connectors and a rated maximum flow capacity of greater than 3,000 CFH (e.g. a meter as illustrated in FIGS. 9 to 13) may have one or more advantages. For example, such a gas meter may be used to replace an existing gas meter that has standard 2-inch flange connectors and a maximum flow rating of 3,000 CFH or less (e.g. a meter as illustrated in FIGS. 1 to 4) without requiring redesign or reconstruction of the existing 2-inch piping system.

Put another way, since the new gas meter—with a larger flow rating—has standard 2-inch flange connections at the meter's inlet and outlet, the new, larger meter (e.g. a meter as illustrated in FIGS. 9 to 13) can be coupled to an existing 2-inch piping system without expanding and/or replacing the pipes and/or flange connections in the existing (2-inch) system, which would typically otherwise be required to install a larger gas meter that has conventional flange connection sizing (e.g. a meter with 3-inch flange connections, e.g. a meter as illustrated in FIGS. 5 to 8). This may save time and/or decrease costs when increasing the rated capacity of an existing gas flow system. For example, this may reduce or avoid time required: to redesign a piping system; to reconfigure a piping system to accommodate a 3-inch flange connection; to leak-test a piping system after installation of the new meter; and/or to shut down and/or ventilate a piping system (e.g. to drain existing gas from a piping system prior to installing new piping and/or flange connections).

As used herein, the wording "and/or" is intended to represent an inclusive-or. That is, "X and/or Y" is intended to mean X or Y or both, for example. As a further example, "X, Y, and/or Z" is intended to mean X or Y or Z or any combination thereof.

While the above description describes features of example embodiments, it will be appreciated that some features and/or functions of the described embodiments are susceptible to modification without departing from the spirit and principles of operation of the described embodiments. For example, the various characteristics which are described by means of the represented embodiments or examples may be selectively combined with each other. Accordingly, what has been described above is intended to be illustrative of the claimed concept and non-limiting. It will be understood by persons skilled in the art that other variants and modifications may be made without departing from the scope of the invention as defined in the claims appended hereto. The scope of the claims should not be limited by the preferred embodiments and examples, but should be given the broadest interpretation consistent with the description as a whole.

The invention claimed is:

1. A rotary gas meter comprising:
a meter body having a gas inlet port and an associated inlet flange connection, a gas outlet port and an associated outlet flange connection, and a main chamber in flow communication with the gas inlet port and the gas outlet port;
wherein at least one undercut is provided in the meter body between the gas inlet port and the main chamber;
wherein at least one undercut is provided in the meter body between the main chamber and the gas outlet port;
wherein the inlet flange connection is a standard 2-inch connection;
wherein the outlet flange connection is a standard 2-inch connection; and
wherein the rotary gas meter has a rated maximum flow capacity of greater than 3,000 CFH (Cubic Feet per Hour).

2. The rotary gas meter of claim 1, wherein the rated maximum flow capacity is between 3,500 CFH and 7,000 CFH.

3. The rotary gas meter of claim 2, wherein the rated maximum flow capacity is about 5,000 CFH.

4. The rotary gas meter claim 1, wherein the inlet flange connection conforms to the ANSI/ASME 16.5 Standard.

5. The rotary gas meter of claim 1, wherein the outlet flange connection conforms to the ANSI/ASME 16.5 Standard.

6. The rotary gas meter of claim 1, wherein the at least one undercut provided in the meter body between the gas inlet port and the main chamber is at an angle of between about 30 degrees and about 60 degrees to the gas inlet port.

7. The rotary gas meter of claim 6, wherein the at least one undercut provided in the meter body between the gas inlet port and the main chamber is at an angle of about 45 degrees to the gas inlet port.

8. The rotary gas meter of claim 1, wherein the at least one undercut provided in the meter body between the main chamber and the gas outlet port is at an angle of between about 30 degrees and about 60 degrees to the gas outlet port.

9. The rotary gas meter of claim 8, wherein the at least one undercut provided in the meter body between the main chamber and the gas outlet port is at an angle of about 45 degrees to the gas outlet port.

10. The rotary gas meter of claim 1, further comprising a positive displacement metering apparatus comprising lobed impellers positioned in the main chamber.

* * * * *